United States Patent [19]

Moore et al.

[11] Patent Number: 5,027,715
[45] Date of Patent: Jul. 2, 1991

[54] SHOCK ABSORBING CARRIER

[75] Inventors: Archie S. Moore, Kansas City; Gareth D. Summa, Riverside, both of Mo.; Ivan C. Owen, Kansas City, Kans.

[73] Assignee: Mid-West Conveyor Company, Inc., Kansas City, Kans.

[21] Appl. No.: 478,686

[22] Filed: Feb. 12, 1990

[51] Int. Cl.⁵ .............................................. B61B 12/04
[52] U.S. Cl. ................................ 104/172.2; 104/172.3
[58] Field of Search ............... 104/172.1, 172.2, 172.3, 104/172.4, 89; 198/343.1, 343.2, 465.4, 465.1, 803.01

[56] References Cited

U.S. PATENT DOCUMENTS

| | | |
|---|---|---|
| 1,141,696 | 6/1915 | Fernanzo . |
| 1,294,467 | 2/1919 | Hovas . |
| 2,667,237 | 1/1954 | Rabinou . |
| 3,044,416 | 7/1962 | Reibel et al. . |
| 3,053,526 | 9/1962 | Kendall . |
| 3,107,753 | 10/1963 | Georgette . |
| 3,110,367 | 11/1963 | Roberts . |
| 3,251,270 | 5/1966 | Seifried . |
| 3,361,084 | 1/1968 | Ellzey . |
| 3,417,660 | 12/1968 | Harbrecht . |
| 3,478,698 | 11/1969 | Jones . |
| 3,720,172 | 3/1973 | Dehne . |
| 3,926,125 | 12/1975 | Ousu . |
| 3,938,625 | 2/1976 | Rodermocher et al. . |
| 4,011,929 | 3/1977 | Jeram . |
| 4,013,015 | 3/1977 | Fromme et al. . |
| 4,019,403 | 4/1977 | Kondo et al. . |
| 4,122,778 | 10/1978 | DiRosa . |
| 4,173,130 | 11/1979 | Sutliff et al. . |
| 4,771,700 | 9/1988 | Wakabayashi ............... 104/172.4 X |
| 2,8223,915 | 2/1958 | DeCarbon . |

FOREIGN PATENT DOCUMENTS 757409 8/1980 U.S.S.R. .

Primary Examiner—D. Glenn Dayoan
Attorney, Agent, or Firm—Litman, McMahon & Brown

[57] ABSTRACT

A shock absorbing load carrier for an inverted power and free conveyor includes a telescoping main frame formed by a leading inner tubular member received in a trailing outer tubular member with a shock absorbing arrangement engaged therebetween. A drive trolley is connected to a front end of the inner member, and a support trolley is connected to a rear end of the outer member. A load supporting framework is mounted on the outer member for fastening a load to be carried thereon. The shock absorbing arrangement includes a damping chamber formed in the inner member and a piston member connected by a rod to the outer member. A particulate damping material, such as a quantity of ball bearings is positioned in the damping chamber. Relative movement of the inner and outer members caused by abrupt startup or braking of the drive trolley is retarded by resistance to movement of the piston through the damping material, thereby reducing the transfer of shocks from the drive trolley to the load.

20 Claims, 2 Drawing Sheets

SHOCK ABSORBING CARRIER

FIELD OF THE INVENTION

The present invention relates to inverted power and free conveyors and, more particularly, to a shock absorbing load carrier arrangement for such a conveyor.

BACKGROUND OF THE INVENTION

In typical power and free conveyors, a load carrier is mounted on a load trolley or trolleys which run on a load or free track. The load carrier is moved by a continuously running power or drive chain by engagement between a drive or pusher dog on the drive chain and a retractable trolley dog on the load carrier or trolley. The drive chain is supported by power trolleys running along a power track. In overhead power and free conveyors, a load supported by the load carrier is suspended below the tracks supporting the load trolleys and the drive chain. The pusher dog extends downward to engage an upwardly extending trolley dog. The trolley dog may be retracted from the pusher dog to allow the load to coast on a downhill section of the load track, to halt the load for operations thereon, or the like. On many power and free conveyors, the load trolleys incorporate accumulation mechanisms which cause drive disengagement of carriers approaching behind a halted carrier to prevent collisions between the carriers.

Inverted power and free conveyors are similar to overhead power and free conveyors except that, as their name suggests, they are turned upside down. On inverted power and free conveyors, a power track supporting the power trolleys carrying the drive chain is at the lowest level. Above the power track is the load or free track supporting the load trolleys, with the load carrier above the load track. The pusher dogs of inverted power and free conveyors extend upward to engage downwardly extending trolley dogs which may be retracted to disengage drive from the load for the same reasons as for overhead track conveyors. Both overhead and inverted power and free conveyors find application in factories, such as on automotive assembly lines to carry automotive bodies as manufacturing operations are performed, in large appliance manufacturing plants, and the like.

Carriers, particularly for inverted power and free conveyors, are usually provided with two spaced apart load trolleys to stabilize the load from pivoting about a lateral axis. The load carrier structure extends between the two load trolleys and has the load clamped, or otherwise temporarily fastened, thereto. Load carriers for overhead power and free conveyors are also often provided with two spaced apart load trolleys to control swinging or rocking about a lateral axis. One of the problems of operating a power and free conveyor is that the engagement of a drive dog on the drive chain with the trolley dog is often abrupt. That is, a stationary load carrier is jerked into motion with minimal slowdown of the drive chain. Braking of the load carriers is also often abrupt. Shock generated by this abrupt engagement of the drive dog with the load carrier or braking of the carrier can be transferred to the load carried with the possibility of damage to the load or disengagement of the load from the load carrier.

In order to reduce the transmission of shock to carried loads from the startup and braking of the load carriers, various shock absorbing arrangements have been devised. The simplest types of shock absorbers involve resilient padding, such as rubber bushings or the like which are positioned in connecting parts between the load trolleys and the carrier frame. Such padding is only marginally effective in reducing the transmission of shocks to the loads. Other types of shock absorbers involve the use of springs between sliding connections of the trolleys and carrier frame. The principal problem with springs along is that once compressed, for example, they recover resiliently and often cause periodic motion or longitudinal bouncing of the load in the direction of travel. Such bouncing of the load strains the load, possibly damaging it, and is often almost as undesirable as an abrupt change in motion.

The most effective types of shock absorbing devices for conveyors of this type are those which damp the shock without converting it to bouncing motion or vibrations. Such devices operate in a manner similar to automotive suspension type shock absorbers and may be similar in construction. Shock absorbers of this type are typically hydraulic or pneumatic cylinders with pistons sliding therein which retard relative movement of the piston and cylinder by forcing the contained fluid through an orifice in the piston. Shock loads applied to one of the members is dissipated in viscous resistance to the flow of the fluid through the orifice and reduced in intensity and abruptness prior to application as motion to the other member of the device. Another known type of shock absorbing device, which operates in a manner analogous to fluid shock absorbers, involves a cylinder filled with a particulate material, such as metal shot or ball bearings, and has a type of piston moving through the material. In this type of cylinder, the shock is dissipated as the piston moves through the material by friction among the particles of the material and, to some degree, inertia of the particles.

Known conveyor arrangements employing true shock damping devices typically employ two trolleys to support the load carrier and load and a third drive trolley connected to the leading support trolley by the shock absorber. Such an arrangement increases the length of the carrier assembly required for each load, resulting in fewer loads capable of being positioned on a given length of conveyor or accumulation zone. Additionally, economic resources are wasted in the third trolley which does not actually support a load.

SUMMARY OF THE INVENTION

The present invention provides a shock absorbing load carrier, particularly for inverted power and free conveyors, which is more compact than previously known shock absorbing carrier arrangements and which does not require any trolleys which do not support the load being carried. The load carrier of the present invention includes a carrier frame formed by a pair of telescoping frame members, an inner frame member connected to a leading drive trolley and an outer frame member connected to a trailing support trolley of the carrier. A framework is affixed to the outer frame member for connection of a load article to the carrier during transit on the conveyor. The drive trolley has a trolley dog depending therefrom which is engaged by a pusher dog on a drive chain of the conveyor for movement of the carrier along the conveyor. Both the support trolley and the drive trolley support the weight of the load and carrier on a load or free track of the conveyor.

Relative movement of the inner and outer frame members is retarded by a shock absorbing arrangement engaged therebetween. In a preferred embodiment of the present invention, a damping chamber is formed within the tubular inner frame member by a pair of spaced apart end caps affixed to the inner surface of the inner member. A rod is connected to the rear end of the outer frame member within the outer member and extends through the end caps in such a manner as to slide through the end caps when there is relative movement between the inner and outer members. A piston is affixed to the rod within the damping chamber. A particulate damping material is positioned within the damping chamber and resists movement of the piston therethrough. Preferably, the damping material is a hard metal shot, such as ball bearings.

There is an annular space between an outer periphery of the piston through which the bearings are forced as the piston is moved through the damping chamber. Mutual friction between the bearings and between the bearings and chamber wall surfaces as the piston crowds the bearings toward one end or the other of the damping chamber resists movement of the piston toward either end of the chamber. When the pusher dog engages the trolley dog, the initial resistance to movement of the piston through the bearings is relatively low which allows the telescoping carrier frame to elongate somewhat. As the bearings are crowded to the end of the damping chamber, the resistance to movement of the piston through the chamber increases to the point at which the load carrier is carried along with the pusher dog. This action softens the abruptness of the engagement between the pusher dog and the trolley dog of the drive trolley. Abrupt braking of the drive trolley is also softened by a reverse series of actions. Braking restores the retracted position of the inner frame member within the outer frame member.

OBJECTS OF THE INVENTION

The principal objects of the present invention are: to provide an improved load carrier for power and free conveyors; to provide, particularly, an improved shock absorbing arrangement for a load carrier to reduce the transmission to a load of shocks caused by abrupt startup and braking of the carrier; to provide such a shock absorbing load carrier which is more compact and requires fewer load trolleys than conventional shock absorbing carriers; to provide such a load carrier which damps the transmission of shocks without causing bouncing movements or significant vibrations to be introduced in the load; to provide such a load carrier including a telescoping main frame formed of intersleeved outer and inner tubular frame members with a shock absorbing arrangement engaged between the frame members and retarding relative movement therebetween; to provide such a load carrier wherein a load supporting framework is mounted on the outer member and a support trolley is connected to a rear end thereof; to provide such a load carrier wherein the inner member extends from a front end of the outer member and has a drive trolley connected to a front end thereof, the drive trolley having a trolley dog projecting therefrom for engagement by a drive dog to propel the carrier along a power and free conveyor; to provide such a load carrier wherein the shock absorbing arrangement includes a damping chamber in one of the frame members with a damping material positioned in the chamber and a piston member connected to the other frame member and positioned within the damping chamber for movement through the damping material; to provide such a load carrier wherein the damping material is a particulate material, such as metal shot or ball bearings; to provide such a load carrier which is adaptable to both overhead and inverted power and free conveyors; to provide such a load carrier which is also adaptable to other types of conveyors and conveyances; and to provide such a shock absorbing load carrier which is economical to manufacture, durable and effective in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
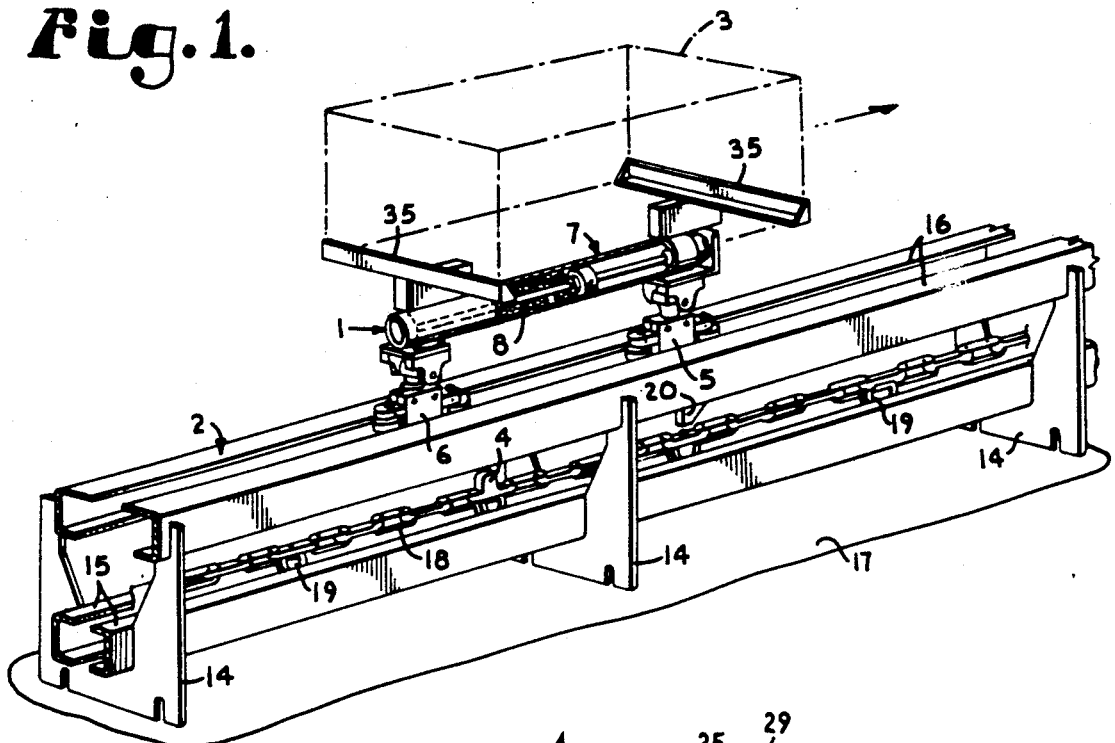
FIG. 1 is a fragmentary perspective view of an inverted power and free conveyor with a shock absorbing carrier embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a shock absorbing load carrier for an inverted power and free conveyor 2 and embodying the present invention. The carrier 1 is configured to prevent the transmission, to a load 3 conveyed on the carrier 1, of shocks generated by abrupt engagement of a pusher dog 4 of the conveyor 2 with a drive trolley 5 of the carrier 1 as well as abrupt braking of the trolley 5. The carrier 1 includes a support trolley 6 connected to a rear end of a telescoping, tubular carrier main frame 7 in spaced relation to the drive trolley 5 at a front end of the frame 7. The carrier frame 7 has a shock absorbing arrangement 8 therein which retards relative movement of the telescoping members of the frame 7.

The illustrated conveyor system 2 is a conventional inverted power and free conveyor and includes standards 14 supporting a power or drive track 15 and a free or load track 16 above a surface 17 which may be a floor of the plant in which the conveyor system 2 is installed. The free track 16 is formed by a pair of inwardly turned channels which support the drive trolley 5 and support trolley 6. The power track 15 is similar to the free track 16 and is illustrated as a pair of mutually inwardly turned channels. The conveyor 2 includes a power or drive chain 18 supported on the power track 15 by power trolleys 19 spaced along the chain 18. Also distributed along the chain 18 are the pusher dogs 4.

The drive trolley 5 has a retractable trolley dog 20 which is extended to be engaged by a pusher dog 4 or retracted for braking the carrier 1 or for free movement of the carrier 1 along the conveyor 2. The drive trolley 5 may also include a holdback dog (not shown) to restrain the carrier 1 from runaway when moving down an inclined section of the conveyor 2. During operation of the conveyor 2, the chain 18 is continuously driven and engagement and disengagement of the carrier 1 is controlled by controlling the position of the drive dog 20. Although the trolley 5 is referred to as a drive trolley, it also supports the weight of the load 3 and carrier 1 on the conveyor 2.

Figure 3:
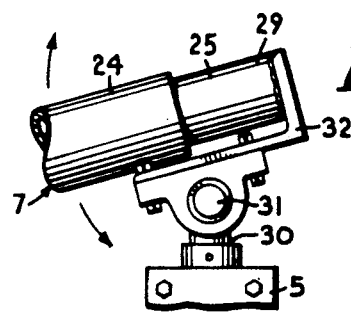
FIG. 3 is an enlarged fragmentary side elevational view of one end of the shock absorbing carrier and illustrates a pivotal connection of the carrier frame to a drive trolley to enable relative pivoting therebetween about a transverse axis.
Figure 2:
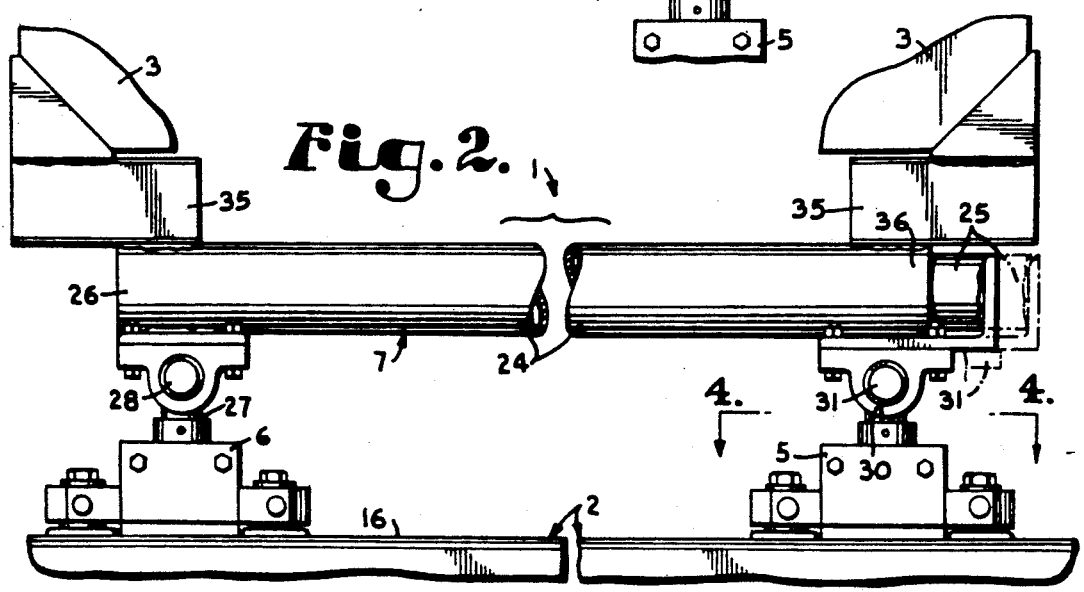
FIG. 2 is an enlarged fragmentary side elevational view of the shock absorbing carrier with a somewhat extended condition of the carrier shown in phantom lines.
Figure 4:
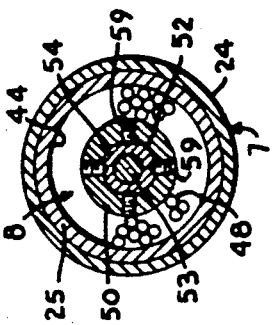
FIG. 4 is a fragmentary transverse sectional view taken on line 4—4 of FIG. 2 and illustrates a pivotal connection of the carrier frame to the drive trolley to enable relative pivoting therebetween about a vertical axis.
Figure 7:
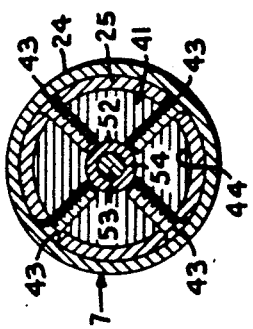
FIG. 7 is a greatly enlarged transverse sectional view taken on line 7—7 of FIG. 5 and illustrates details of an end cap of the shock absorbing carrier frame.
Figure 8:
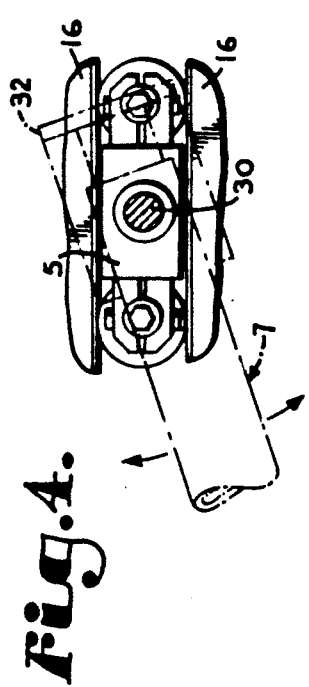
FIG. 8 is a greatly enlarged transverse sectional view taken on line 8—8 of FIG. 5 and illustrates details of a piston member of the shock absorbing carrier frame.
Figure 5:
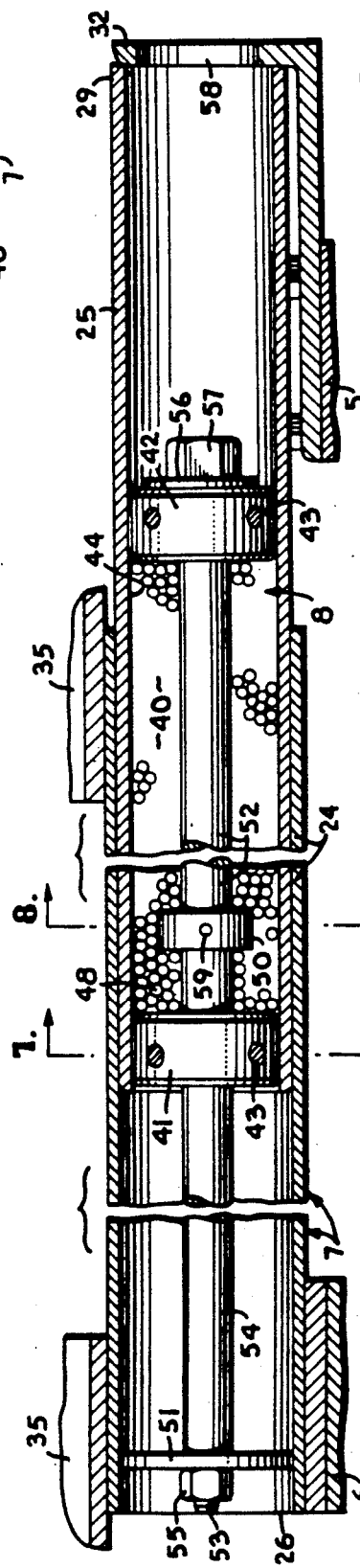
FIG. 5 is a greatly enlarged fragmentary longitudinal sectional view of shock absorbing components of the load carrier of the present invention and illustrates the carrier frame in an extended condition.
Figure 6:
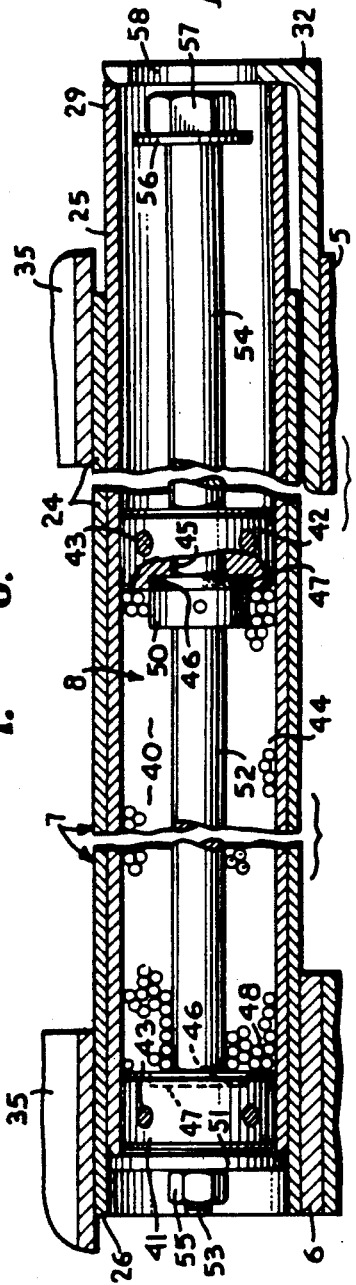
FIG. 6 is a view similar to FIG. 5 and illustrates the carrier frame in a retracted condition.

The telescoping carrier main frame 7 is formed of an outer tubular frame member or outer tube 24 and an inner tubular frame member or inner tube 25 slidably received within the outer tube 24. The support trolley 6 is pivotally connected to a rear end 26 of the outer tube 24 by a vertical pivot joint 27 for pivoting of the tube 24 about a vertical axis relative to the support trolley and by a transverse pivot joint 28 for pivoting about a transverse axis. Similarly, the drive trolley 5 is pivotally connected to a front end 29 of the inner tube 25 by a vertical pivot joint 30 and a transverse pivot joint 31. In the illustrated carrier 1, the transverse pivot joint 31 is connected to the inner tube 25 by an L-bracket 32. The pivot joints 27, 28, 30, and 31 allow pivoting of either of the trolleys 5 and 6 relative to the main frame 7 as for following transitions between level and inclined sections of the conveyor 2, as illustrated in FIG. 3, and for following lateral curves of the conveyor 2, as shown in FIG. 4.

The outer tube 24 has load support brackets 35 attached thereto, as by welding, at the rear end 26 and at a front end 36 thereof. In normal operation of the conveyor 2, the load 3 is temporarily fastened or clamped to the load brackets 35. The tubes 24 and 25 of the frame 7 are illustrated as having circular cross sections. Because of this, the support trolley 6 supports the weight of the load 3 and additionally resists lateral tipping moments of the load 3, as when the carrier 1 is conveyed about a lateral curve of the conveyor 2. Because of the circular cross sections of the tubes 24 and 25, the inner tube 25 is free to twist relative to the outer tube 24. This is not a problem for light to moderate weight and sized loads 3, such as refrigerators and similar appliances. However, for heavier loads, such as automotive bodies, and severely top heavy loads, it is foreseen that it might be desirable to form the tubes 24 and 25 from noncircular cross section stock, such as rectangular or square tube stock. This would enable the drive trolley 5 to carry some of the lateral tipping loads of the carrier 1. Such variations in the cross sectional shape of the frame members 24 and 25 are considered to fall within the scope of the present invention.

In a preferred embodiment of the carrier 1, the shock absorbing arrangement 8 is a particulate type of shock absorber in which relative movement of the frame members 24 and 25 is retarded by a particulate type of damping material. Referring particularly to FIGS. 5-8, a damping chamber 40 is formed within the inner tube 25 by a pair of end caps 41 and 42 which are attached in spaced apart relation, as by fasteners 43, to an inner surface 44 of the inner tube 25. Each of the caps 41 and 42 has a central bore 45 formed therethrough and a counterbore 46 on the surface thereof within the chamber 40. A felt washer or pad 47 is positioned within each of the counterbores 46. A quantity of a particulate damping material 48 is positioned within the damping chamber 40. The material 48 may, for example, be a hard metal shot and preferably is a quantity of steel ball bearings, each having a diameter of about one eighth inch.

The outer tube 24 has a piston member 50 connected thereto and positioned within the damping chamber 40 for movement through the damping material 48. In the illustrated shock absorbing arrangement 8, an anchor plate 51 is affixed within the outer tube 24 near the rear end 26 thereof, as by welding. A piston rod 52 is attached to the anchor plate 51 and extends coaxially through the outer tube 24, the inner tube 25, and slidably through the bores 45 of the end caps 41 and 42. The illustrated piston rod 52 is formed by a bolt 53 with an outer sleeve 54 thereon. The rod 52 is connected to the plate 51 by a nut 55 which clamps the plate 51, the sleeve 54, and a head end washer 56 between itself and a bolt head 57 of the bolt 53. Access to the bolt head 57 is provided by an access opening 58 through the upper leg of the L-bracket 32. The piston member 50 is fastened to the rod 52 by fasteners 59, such as set screws. The piston member 50 may be fastened directly to the sleeve 54, as shown, or the sleeve 54 may be provided in sections with inner ends thereof abutting the piston member 50 and with the screws 59 engaging the bolt 53 directly.

In the shock absorbing arrangement 8 illustrated, the damping chamber 40 and damping material 48 are normally moved relative to the piston member 50. The retarding effect on this relative movement of the inner and outer tubes 25 and 24 is substantially the same as if the piston member 50 were moved relative to the damping material 48. The quantity of damping material 48 required for the chamber 40 depends on a number of factors including the relative diameters of the piston 50 and the inner surface 44, the size of the bearings 48, the coefficients of friction between the bearings 48 mutually and with the other surfaces within the chamber 40 engaged by the bearings, and the degree of damping desired. The illustrated chamber 40 is somewhat more than half filled with the bearings 48. In general, the damping effect created by the arrangement 8 is a result of friction between the bearings 48 and surfaces contacted by them and, to a lesser extent, inertia of the bearings 48.

In operation, the carrier 1 is initially stationary and the carrier frame 7 is retracted. Engagement of a pusher dog 4 with the trolley dog 20 abruptly urges the drive trolley 5 into motion. Inertia of the remainder of the carrier 1 and the load 3 cause them to initially remain stationary. The inner tube 25 is, thus, drawn from the outer tube 24, causing the bearings 48 to be drawn past the piston member 50. Initially, there is little resistance to movement of the bearings 48 past the piston 50. As the bearings 48 become crowded toward the rear end of the chamber 40, the resistance to movement of the bearings through the annular space about the piston 50 increases. As the resistance increases, the outer tube 24 and load 3 are drawn into motion along with the inner tube 24. Finally, the rear end cap 41 positively abuts the piston 50 with, possibly, some bearings 48 caught therebetween. The outer tube 24 and load 3 are now positively in motion with the inner tube 25. The lagging transfer of motion from the drive trolley 5 to the load 3 reduces the transfer of shock thereto.

The illustrated shock absorbing arrangement 8 is not self restoring. Thus, the inner tube 25 remains extended from the outer tube 24 as the carrier 1 is conveyed along the conveyor 2. This prepares the carrier 1 for an abrupt braking or an accumulation engagement with another carrier which has been stopped on the conveyor 2. Shock generated by abrupt braking of the drive trolley 5 is reduced before reaching the load 3 in the same manner as in the startup situation, except in the opposite direction. The shock absorbing effect of the arrangement 8 on braking additionally reduces the transfer of shock to braking structures (not shown) and stationary load carriers in accumulation zones.

The carrier 1 of the present invention provides a shock absorbing arrangement 8 which is incorporated within the carrier 1 itself. This omits the need for a third trolley for each load 3 carried and decreases the length of the conveyor 2 needed to accommodate each load carried. The use of a particulate type of shock absorbing arrangement 8 simplifies the construction of same since sliding fluid seals are not required. However, it is foreseen that conventional hydraulic and pneumatic shock absorber equivalents of the particulate shock absorbing arrangement 8 could be incorporated in the carrier 1.

It is to be understood that while certain forms of the present invention have been illustrated and described herein, it is not to be limited to the specific forms or arrangement of parts described and shown.

What is claimed and desired to be secured by Letters Patent is as follows:

1. A shock absorbing load carrier for a conveyor including means forming a carrier support surface and a carrier drive member engageable with said carrier to propel same along said support surface, said carrier comprising:
   (a) an elongated carrier frame member adapted to supporting a load;
   (b) a support trolley connected to said frame member and adapted to engage said support surface for movement therealong;
   (c) a drive trolley partially supporting said load and adapted to engage said support surface and to be drivingly engaged by said drive member to propel said carrier along said support surface; and
   (d) shock absorbing means connecting said drive trolley to said frame member whereby shock generated by engagement of said drive member with said drive trolley and braking thereof is damped to reduced transmission of said shock to said load supported by said frame member.

2. A carrier as set forth in claim 1 wherein:
   (a) said frame member has a front end and a rear end;
   (b) said support trolley is connected to said frame member at said rear end; and
   (c) said drive trolley is connected to said frame member by said shock absorbing means generally at said front end of said frame member.

3. A shock absorbing load carrier for a conveyor including means forming a carrier support surface and a carrier drive member engageable with said carrier to propel same along said support surface, said carrier comprising:
   (a) an elongated carrier frame member adapted for supporting a load;
   (b) a support trolley connected to said frame member and adapted to engage said support surface for movement therealong;
   (c) a drive trolley adapted to engage said support surface and to be drivingly engaged by said drive member to propel said carrier along said support surface;
   (d) shock absorbing means connecting said drive trolley to said frame member whereby shock generated by engagement of said drive member with said drive trolley and braking thereof is damped to reduce transmission of said shock to said load supported by said frame member; and
   (e) said shock absorbing means including:
      (1) said drive trolley including an elongated drive frame member;
      (2) said drive frame member being intersleeved with said carrier frame member; and
      (3) damping means engaged between said drive frame member and said carrier frame member and retarding relative movement therebetween to thereby reduce said transmission of shock.

4. A carrier as set forth in claim 3 wherein said shock absorbing means includes:
   (a) one of said drive frame member and said carrier frame member having a damping chamber formed therein;
   (b) said chamber having a damping material positioned therein, said material resisting the movement of a body therethrough; and
   (c) the other of said drive frame member and said carrier frame member having piston means connected thereto and positioned within said chamber to be relatively movable therein through said material whereby relative movement between said drive frame member and said carrier frame member is retarded.

5. A carrier as set forth in claim 4 wherein:
   (a) said damping material includes a quantity of metal shot.

6. A carrier as set forth in claim 4 wherein:
   (a) said damping material includes a quantity of metal ball bearings.

7. A shock absorbing load carrier for a conveyor including means forming a carrier support surface and a carrier drive member engageable with said carrier to propel same along said support surface, said carrier comprising:

(a) a carrier frame adapted for supporting a load, said frame including a first frame member and a second frame member, said first and second frame members being engaged in such a manner as to enable limited relative movement therebetween;

(b) a first trolley connected to said first frame member and a second trolley connected to said second frame member, each of said trolleys being adapted to engage said support surface for movement therealong, one of said trolleys being adapted to be drivingly engaged by said drive member to propel said carrier along said support surface; and (c) shock absorbing means connecting said first and second frame members in such a manner that shock generated by engagement of said drive member with said one trolley and braking thereof is damped to reduce transmission of said shock to a load supported by said frame.

8. A carrier as set forth in claim 7 wherein said shock absorbing means includes:

(a) one of said frame members being tubular and having the other of said frame members sleeved therein; and (b) damping means engaged between said carrier frame members and retarding relative movement therebetween to thereby reduce said transmission of shock.

9. A carrier as set forth in claim 7 wherein said damping means includes:

(a) one of said frame members having a damping chamber formed therein;

(b) said chamber having a damping material positioned therein, said material resisting the movement of a body therethrough; and (c) the other of said frame members having piston means connected thereto and positioned within said chamber to be relatively movable therein through said material whereby relative movement between said frame members is retarded.

10. A carrier as set forth in claim 9 wherein:

(a) said damping material includes a quantity of metal shot.

11. A carrier as set forth in claim 9 wherein said damping means includes:

(a) said damping chamber being formed by a pair of spaced apart end caps positioned within said one frame member;

(b) said other frame member has a rod connected thereto and extending through said end caps whereby relative movement of said frame members causes said rod to slide through said end caps; and (c) said piston means is positioned on said rod within said damping chamber to move through said damping material.

12. A carrier as set forth in claim 11 wherein:

(a) said damping material includes a quantity of metal shot.

13. A carrier as set forth in claim 11 wherein:

(a) said damping material includes a quantity of metal ball bearings.

14. A carrier as set forth in claim 7 wherein:

(a) said first frame member is tubular and has a front end and a rear end;

(b) said first trolley is connected to said first frame member at said rear end;

(c) said second frame member has a front end and a rear end and is sleeved within said first frame member with said front end of said second frame member extending from said front end of said first frame member; and (d) said second trolley is connected to said front end of said second frame member.

15. A shock absorbing load carrier for a power and free conveyor including a carrier supporting track and a drive chain engageable with said carrier to propel same along said track, said carrier comprising:

(a) an outer carrier frame member adapted for supporting a load, said outer frame member being elongated and tubular and having a front end and a rear end;

(b) an inner carrier frame member which is elongated and tubular and has a front end and a rear end, said inner frame member being sleeved within said outer carrier member whereby said front end of said inner frame member extends from said front end of said outer frame member;

(c) a support trolley connected to said rear end of said outer frame member and being adapted to engage said track for movement therealong;

(d) a drive trolley connected to said front end of said inner frame member and being adapted to engage said track and to be drivingly engaged by said drive chain to propel said carrier along said track; and (e) shock absorbing means connecting said inner and outer frame members in such a manner that shock generated by engagement of said drive chain with said drive trolley and braking thereof is damped to reduce transmission of said shock to a load supported by said outer frame member.

16. A carrier as set forth in claim 15 wherein said damping means includes:

(a) one of said frame members having a damping chamber formed therein;

(b) said chamber having a damping material positioned therein, said material resisting the movement of a body therethrough; and (c) the other of said frame members having piston means connected thereto and positioned within said chamber to be relatively movable therein through said material whereby relative movement between said frame members is retarded.

17. A carrier as set forth in claim 16 wherein:

(a) said damping material includes a quantity of metal shot.

18. A carrier as set forth in claim 15 wherein said shock absorbing means includes:

(a) said inner frame member having a damping chamber formed therein by a pair of end caps affixed to an inner surface of said inner frame member in spaced apart relation;

(b) said outer frame member having a rod positioned therein, connected to said rear end of said outer frame member, and extending through said end caps whereby relative movement of said inner and outer frame member causes said rod to slide through said end caps;

(c) said damping chamber having a damping material positioned therein, said material resisting the movement of a body therethrough; and (d) piston means affixed to said rod within said damping chamber to be movable through said damping material when said rod slides through said end caps to thereby retard relative movement of said inner and outer frame members.

19. A carrier as set forth in claim 18 wherein:

(a) said damping material includes a quantity of metal shot.

20. A carrier as set forth in claim 18 wherein:

(a) said damping material includes a quantity of metal ball bearings.

* * * * *